W. O. GUICE.
PORTABLE VARNISH DRYING OVEN.
APPLICATION FILED OCT. 29, 1919.

1,352,893.

Patented Sept. 14, 1920.
2 SHEETS—SHEET 1.

Inventor
William O. Guice,
By Mason Fenwick & Lawrence, Attorney

W. O. GUICE.
PORTABLE VARNISH DRYING OVEN.
APPLICATION FILED OCT. 29, 1919.
1,352,893.
Patented Sept. 14, 1920.
2 SHEETS—SHEET 2.
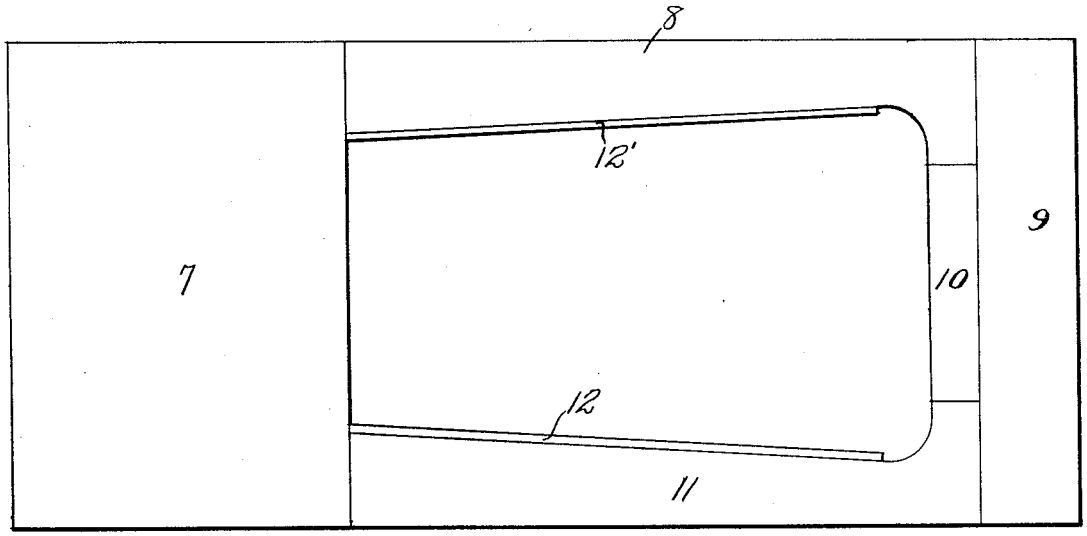
Fig. 2.
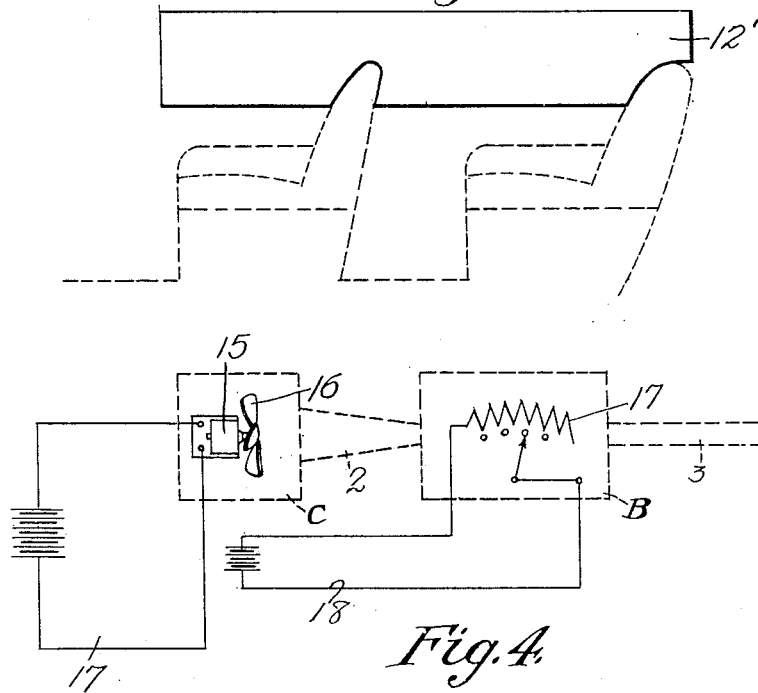
Fig. 3.
Fig. 4.
Inventor
William O. Guice
By Mason Fenwick Lawrence, Attorney

UNITED STATES PATENT OFFICE.

WILLIAM O. GUICE, OF SEATTLE, WASHINGTON.

PORTABLE VARNISH-DRYING OVEN.

1,352,893. Specification of Letters Patent. Patented Sept. 14, 1920.

Application filed October 29, 1919. Serial No. 334,314.

*To all whom it may concern:*

Be it known that I, WILLIAM O. GUICE, a citizen of the United States, residing at Seattle, in the county of King and State of Washington, have invented certain new and useful Improvements in Portable Varnish-Drying Ovens; and I do hereby declare the following to be a full, clear, and exact description of the invention, such as will enable others skilled in the art to which it appertains to make and use the same.

This invention relates to varnish drying ovens and while particularly adapted to varnish drying ovens for automobiles, is not limited thereto.

An object of this invention is to provide an oven for drying varnish on automobiles and especially where successive coats of varnish are applied to automobiles and where it is desired to apply varnish to automobiles which under ordinary circumstances would require as high as three weeks' time in order to dry the respective coats of varnish and this is especially so in cold weather and weather unadapted to the drying of varnish after it has been applied.

It is an object of this invention to provide a portable oven which may be quickly enveloped around an automobile and to provide a means for varying the heat and for keeping a constant desired and predetermined temperature, and to provide further means for causing the flow of the heat into the said oven under the desired conditions.

It is a further object of this invention to provide an electrical heater for varnish drying ovens and to provide a means for controlling the temperature of the said electric heater and the temperature of the air passing thereover.

It is a further object of this invention to provide a means for blowing heat into a varnish drying oven in order to provide heat therein from a simple heater, and a detachable and portable oven and to provide it for further purposes in relation to said blower.

It is a further object of this invention to provide a quickly knocked down and portable varnish drying oven for automobiles and the like, and also to provide a quickly detachable and easily portable heating means.

It is a further object of this invention to provide a varnish drying oven and heater therefor in such separate units as will make it heatable and readily portable and adjustable and adaptable to varying sized cars.

With these and other objects in view the invention consists of the construction, the combination and the detail and arrangement as hereinafter more fully described and claimed.

Fig. 2 is a plan view of the varnish drying oven.

Fig. 3 is a fragmentary side section showing the connections of the said oven with the seats of an automobile.

Fig. 4 is a diagrammatic view of the heating system.

Figure 1:
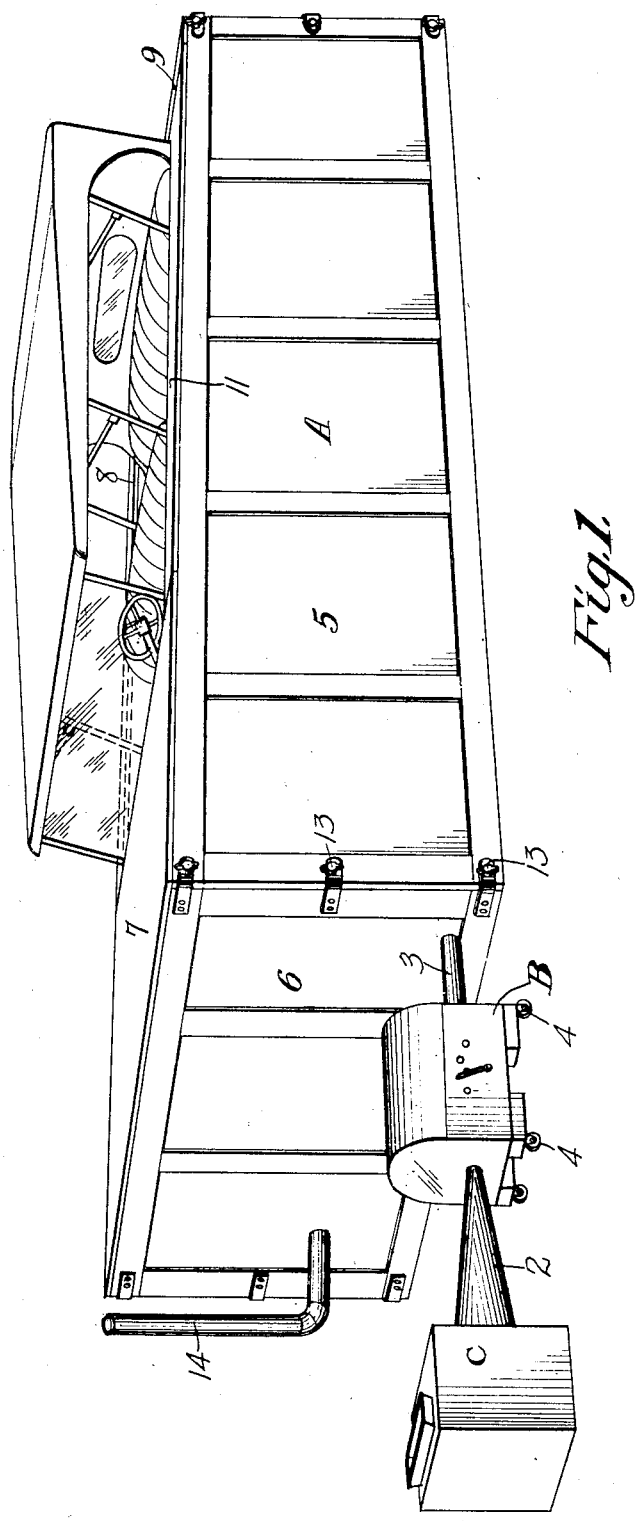
Figure 1 is a perspective of the varnish drying oven together with heating attachment therefor.

In detail the invention comprises an oven A, an electric heater B and a blower C. A conical conduit 2 connects blower C with heater B and a conduit 3 connects heater B with oven A. Heater B is suitably mounted on rollers 4 detachable from conduits 2 and 3 by relative movement. Oven A is made up of sections 5 and 6 and top sections 7, 8, 9, 10 and 11 and interior sections 12 and 12'. Side sections 5 and 6 are relatively clamped by wing nuts 13, thus providing for the suitable insertion of the top sections. These sections are variable in accord with the different sized automobiles, as for instance the side sections will accommodate several different sizes and types of automobiles without leaving any undue space therearound but the top sections may be varied in accord with the different types and styles of automobiles, and on the other hand by the interchanging of the various sections as for instance the side and top sections various other sizes of automobiles may be accommodated. From oven A is also provided a vent pipe 14. Blower C is provided with a motor 15 driving a fan 16 having preferably suitable electrical connections 17, but it is obvious that the fan may be driven by any other unit. Heater B comprising a hot plate of preferably resistant form is insulated in the usual manner and controlled by a rheostat 17, which rheostat controls the electrical current from any suitable electrical generating system 18.

Thus it is obvious that in operation all that is essential is to operate the fan in the blower C causing a draft to go through the funnel shaped conduit 2 over the heater B and into the oven A and regulate the same by suitable governing of the fan 16 and the heater B.

In some cases I desire to use the electric heater inside of the oven with the aid of the fan particularly to circulate the heat and by this means I am enabled to conserve electricity.

What I claim is:

1. In combination, a box having a motor therein, a fan on said motor, a vehicle carrying an electric heater, a collapsible varnish drying oven, a conduit from the heater to said oven and a conduit from the blower to the heater.

2. In combination, a portable varnish drying oven comprising side wall sections and means for clamping the same together, a plurality of top sections, a pipe from said oven and means for blowing heated air into the oven.

3. In combination, a heater, a blower, a funnel-shaped conduit connecting the blower and heater, a collapsible varnish drying oven, and a conduit from said heater into the varnish drying oven.

4. In combination, a portable varnish drying oven, a vehicle carrying a heater having a conduit leading into said oven and a detachable blower having a conduit leading into said heater.

5. In combination, a box having a motor therein, a fan on said motor, a vehicle carrying an electric heater, a collapsible varnish drying oven, said oven adaptable to receive an automobile, a conduit from said heater to said oven and a conduit from said blower to said heater.

6. In combination, a portable varnish drying oven for automobiles comprising side wall sections and means for clamping the same together, a plurality of top sections adapted to fit around an automobile, a feed pipe from said oven, and means for blowing heated air into said oven.

In testimony whereof I affix my signature.

WILLIAM O. GUICE.